United States Patent
Shannon, III

(10) Patent No.: US 10,148,307 B2
(45) Date of Patent: Dec. 4, 2018

(54) ELECTRONIC DEVICE PROTECTION APPARATUS WITH OFF-SCREEN SWIPING INTERFACE

(71) Applicant: BobjGear, LLC, Clermont, FL (US)

(72) Inventor: Robert James Shannon, III, Clermont, FL (US)

(73) Assignee: BobjGear, LLC, Clermont, FL (US)

( * ) Notice: Subject to any disclaimer, the term of this patent is extended or adjusted under 35 U.S.C. 154(b) by 0 days.

(21) Appl. No.: 15/844,318

(22) Filed: Dec. 15, 2017

(65) Prior Publication Data

US 2018/0138936 A1 May 17, 2018

Related U.S. Application Data

(63) Continuation-in-part of application No. 29/584,605, filed on Nov. 16, 2016.

(51) Int. Cl.
| | |
|---|---|
| *H04M 1/00* | (2006.01) |
| *H04B 1/38* | (2015.01) |
| *H04B 1/3888* | (2015.01) |
| *G06F 1/16* | (2006.01) |
| *G06F 3/0488* | (2013.01) |

(52) U.S. Cl.
CPC ......... *H04B 1/3888* (2013.01); *G06F 1/1628* (2013.01); *G06F 3/04883* (2013.01)

(58) Field of Classification Search
CPC .......................... H04M 1/185; H04M 2250/22; H04B 1/3833; H04B 1/3888
USPC .............. 455/90.3, 575.2, 575.8, 575.1
See application file for complete search history.

(56) References Cited

U.S. PATENT DOCUMENTS

| | | | |
|---|---|---|---|
| D597,052 S | 7/2009 | Kim et al. | |
| D649,144 S | 11/2011 | Fathollahi | |
| D694,759 S | 12/2013 | Chang et al. | |
| D721,703 S | 1/2015 | Han | |
| D724,093 S | 3/2015 | Dong | |
| D725,116 S | 3/2015 | Li | |
| 9,112,956 B2 * | 8/2015 | Huang ................ | H04B 1/3888 |
| D763,840 S | 8/2016 | Hwang | |
| D766,907 S | 9/2016 | Veltz et al. | |
| D770,458 S | 11/2016 | Corcoran et al. | |
| 9,622,556 B2 * | 4/2017 | Fathollahi ............. | A45C 11/00 |
| D786,853 S | 5/2017 | Friedland et al. | |
| D787,497 S | 5/2017 | Friedland et al. | |
| D789,937 S | 6/2017 | Zhang | |
| D792,886 S | 7/2017 | Schwibner et al. | |

(Continued)

*Primary Examiner* — Quochien B Vuong
(74) *Attorney, Agent, or Firm* — Perman & Green, LLP

(57) ABSTRACT

An electronic device protection apparatus conformal with an electronic device, the electronic device protection apparatus including a retaining sheath having a base section disposed so as to cover the rear of the electronic device and a ring section, including an inner channel, forming a perimeter around and receiving the exterior edge of the electronic device into the inner channel; and at least one fingerswipe indentation disposed on the ring section, wherein the at least one fingerswipe indentation is configured to interface with a touch-sensitive display region of the electronic device so as to effect off-screen swiping functionality of a graphical user interface of the touch-sensitive display region of the electronic device retained in the electronic device protection apparatus.

20 Claims, 6 Drawing Sheets

(56) References Cited

U.S. PATENT DOCUMENTS 9,741,188 B2 * 8/2017 Seagraves .......... G07C 9/00309
2012/0012579 A1 * 1/2012 Kaplancali ............. A45C 11/00
220/4.02

* cited by examiner

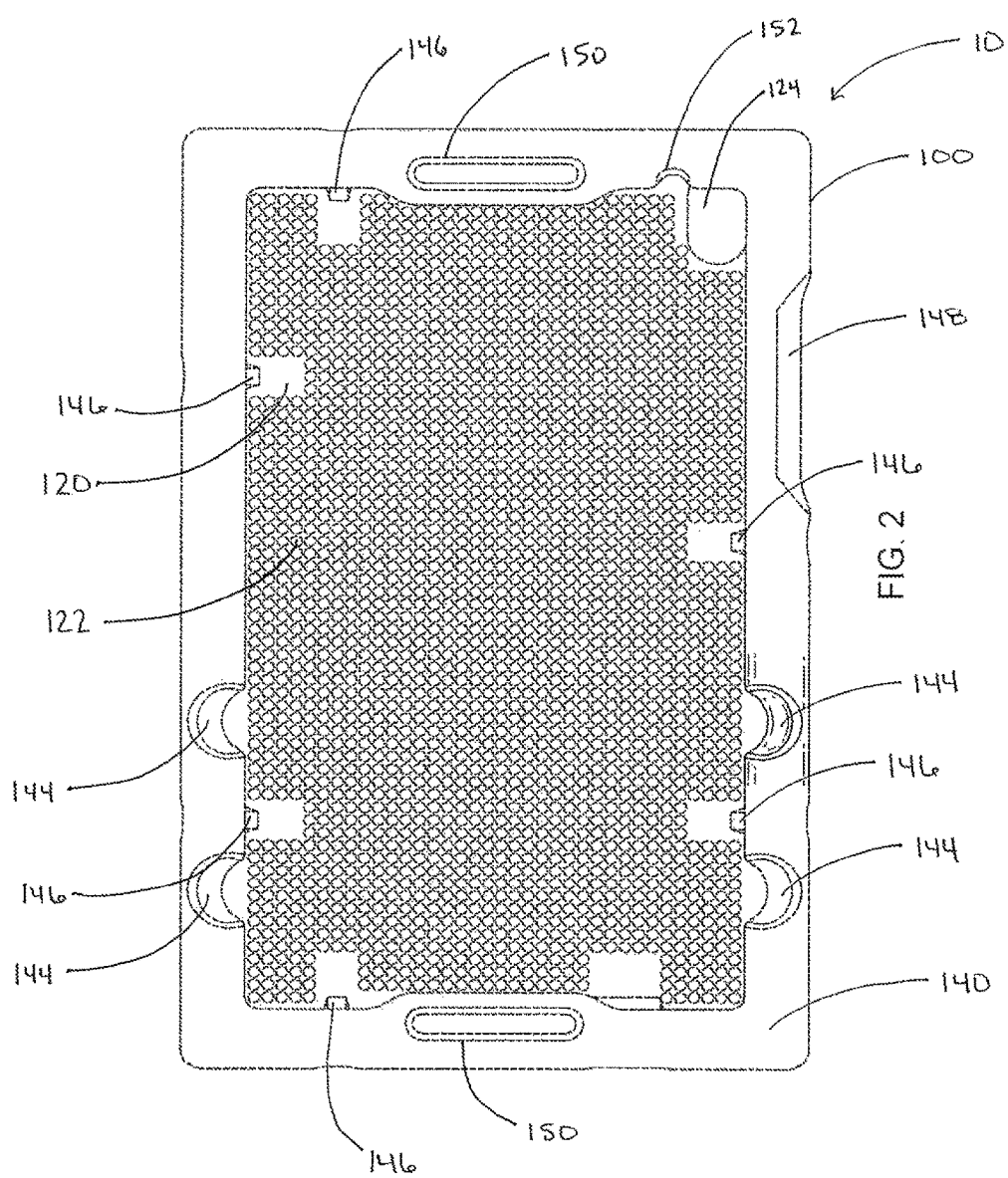

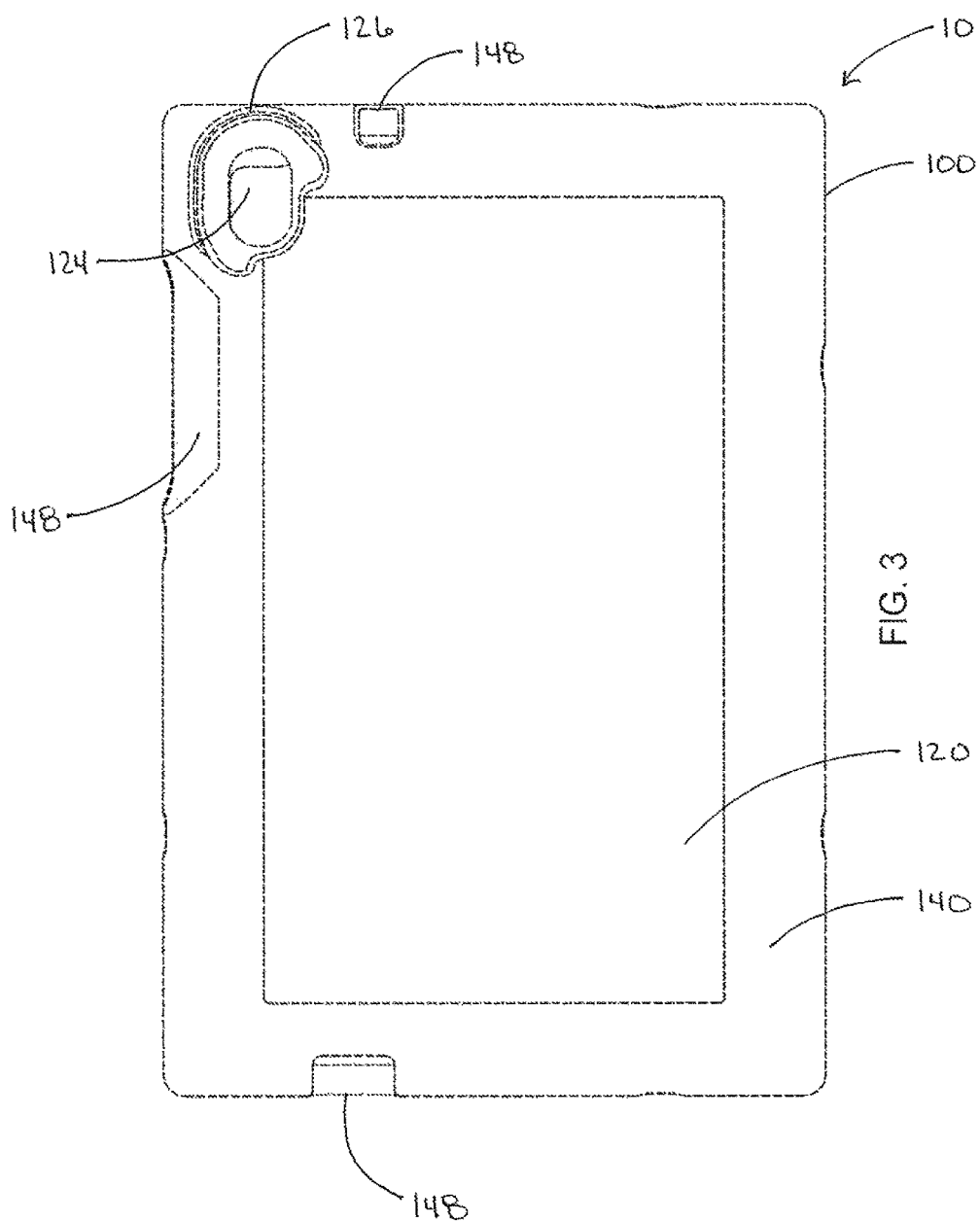

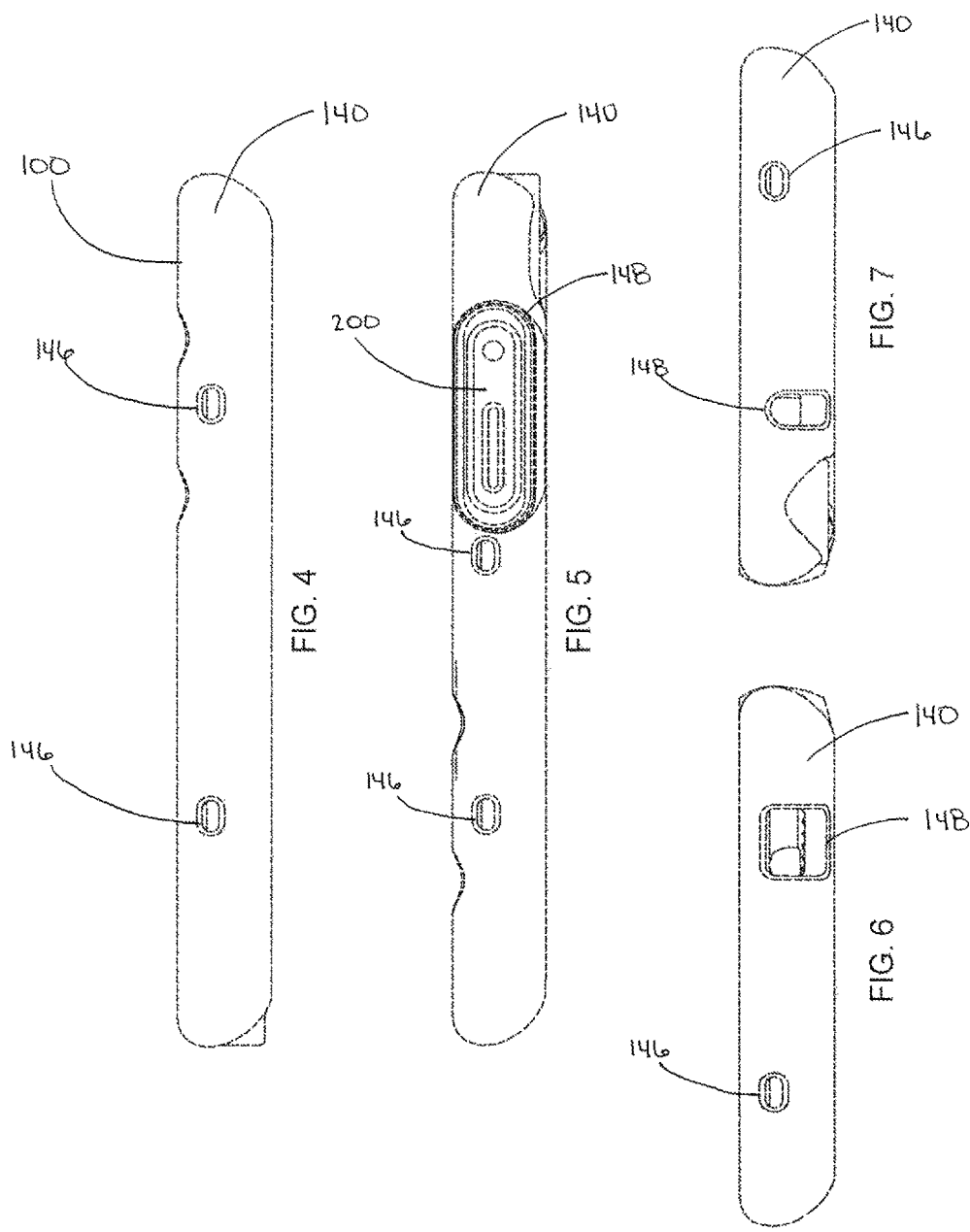

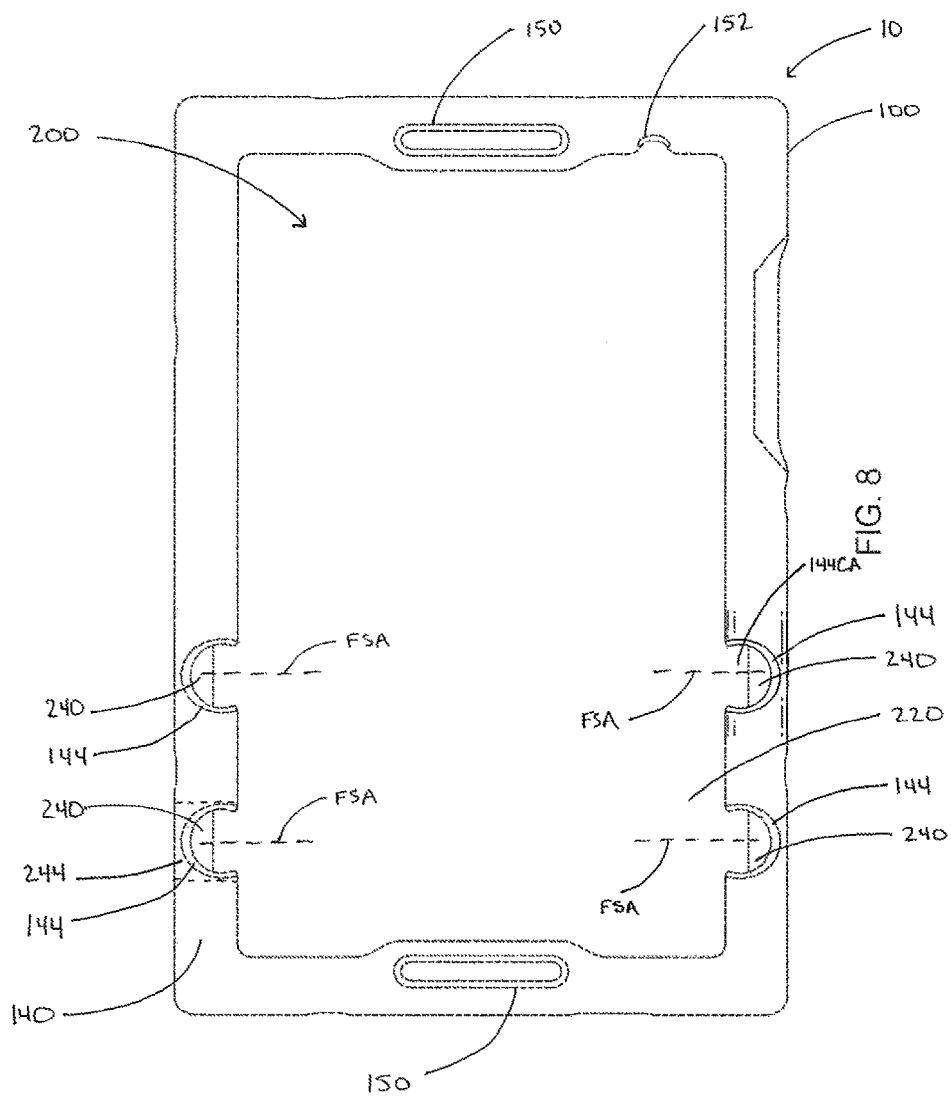

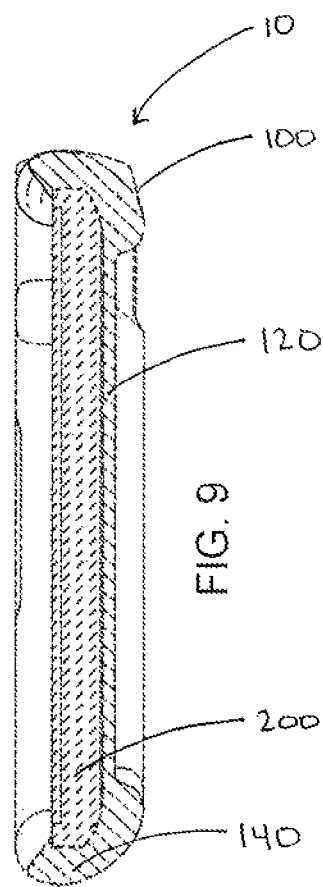

ELECTRONIC DEVICE PROTECTION APPARATUS WITH OFF-SCREEN SWIPING INTERFACE

CROSS-REFERENCE TO RELATED APPLICATIONS

This application is a continuation-in-part of and claims the benefit of U.S. Design patent application Ser. No. 25/584,605, filed Nov. 16, 2016, the disclosure of which is incorporated herein by reference in its entirety.

BACKGROUND

1. Field

The aspects of the disclosed embodiment generally relate to electronic device accessories, and more particularly to electronic device cases.

2. Brief Description of Related Developments

Electronic device cases have proven to be a valuable tool for the physical protection of sensitive electronic devices such as, for example, tablets and smartphones. Conventional cases have provided protection to electronic devices by encompassing nearly the entire device, with the exception of the screen.

A disadvantage of conventional covers is that, for electronic devices possessing "off-screen swiping" (i.e., finger swiping or edge swiping) functionality, cases can obstruct the use of said off-screen swiping functionality by blocking desired off-screen portions of the device. Thus, it would be advantageous for a case to provide physical protection to electronic devices without compromising electronic device off-screen swiping functionality.

BRIEF DESCRIPTION OF THE DRAWINGS

The aspects of the present disclosure herein will be understood and appreciated more fully from the following detailed description taken in conjunction with the drawings in which:

FIG. 2 depicts a front view of the exemplary apparatus of FIG. 1, according to aspects of the present disclosure;

FIG. 3 depicts a back view of the exemplary apparatus of FIG. 1, according to aspects of the present disclosure;

FIG. 4 depicts a left-side view of the exemplary apparatus of FIG. 1, according to aspects of the present disclosure;

FIG. 5 depicts a right-side view of the exemplary apparatus of FIG. 1, according to aspects of the present disclosure;

FIG. 6 depicts a bottom view of the exemplary apparatus of FIG. 1, according to aspects of the present disclosure;

FIG. 7 depicts a top view of the exemplary apparatus of FIG. 1, according to aspects of the present disclosure;

FIG. 8 depicts a front view of the exemplary apparatus of FIG. 1, covering an exemplary electronic device, according to aspects of the present disclosure;

FIG. 9 depicts a cross-sectional bottom view of the exemplary apparatus of FIG. 1, covering the electronic device indicated in FIG. 8, according to aspects of the present disclosure.

DETAILED DESCRIPTION

Figure 1:
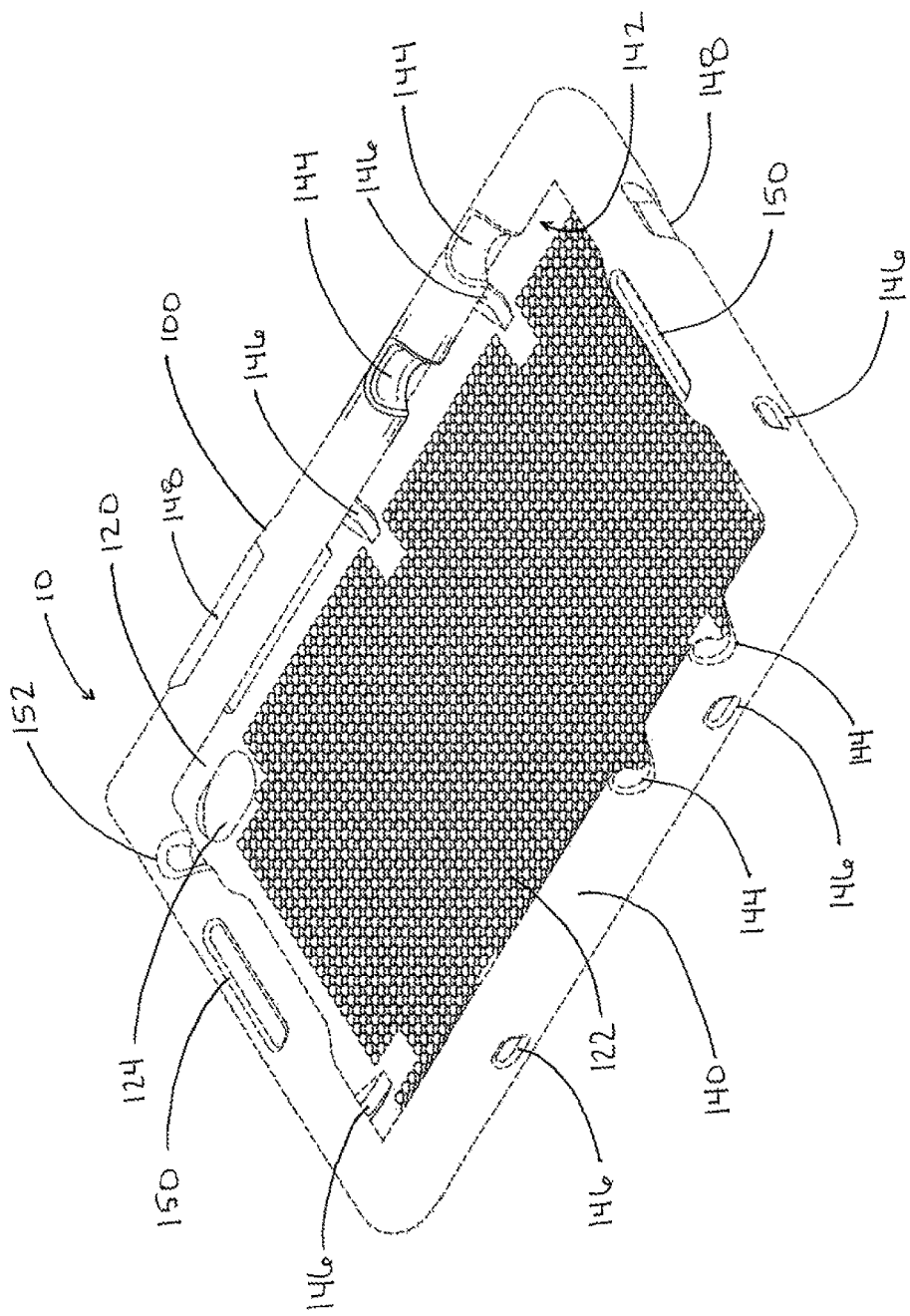
FIG. 1 is a front-perspective view of an exemplary electronic device protection apparatus, according to aspects of the present disclosure.

The apparatus in accordance with the present disclosure may allow electronic device users to interface with the graphical user interface (GUI) of an electronic device, using off-screen swiping gestures, while providing the electronic device with the physical protection features desirable in an electronic device case.

As used herein, the term "electronic device" may be any tablet, touchpad, smartphone, laptop, electronic display or any other electronic device with a touch-sensitive display. Further, the terms "off-screen swipe" or "off-screen swiping" (also commonly called "edge swiping" or "finger swiping") refer to gestures used to interface with a GUI of an electronic device by interacting with both a non-display region and a touch-sensitive display region of an electronic device in a single gesture performed with a single finger or multiple fingers of the electronic device user. Swiping in a direction with a single finger may effect a different interaction with the GUI than a swipe in the same direction with two or more fingers. Off-screen swiping gestures may be used, for example, on electronic devices using the Windows 10 operating system, to perform specific navigation functions on the electronic device GUI.

Referring to FIGS. 1 and 8, the aspects of the present disclosure provide for an electronic device protection apparatus 10 for assisting electronic device 200 users with electronic device 200 interfacing through the use of off-screen swiping gestures. Although the aspects of the present disclosure will be described with reference to the embodiment shown in the drawings, it should be understood that the disclosed embodiment can be embodied in many alternate forms. In addition, any suitable size, shape or type of elements or materials could be used.

As will hereinafter be described more fully, the electronic device protection apparatus 10 performs a number of mechanical and interfacing functions conforming to the corresponding electronic device 200 model. The electronic device protection apparatus 10 includes a retaining sheath 100. The retaining sheath 100 may include one or more of a base section 120 and what may be generally referred to as a rim section or a ring section 140. The ring section 140 may include at least one fingerswipe indentation 144.

Referring to FIGS. 1, 2 and 8, the base section 120 of the retaining sheath 100 may be disposed so as to cover the rear surface of the electronic device 200. The base section 120 may include a gripping surface 122 configured to grip the rear surface of the electronic device 200 in opposition to an off-screen swiping gesture on a plane of the electronic device. As will hereinafter be described more fully, the gripping feature of the gripping surface 122 assists in maintaining the orientation of the at least one fingerswipe indentation 144 with respect to a touch-sensitive display region 220 of the electronic device 200. The gripping surface 122 may comprise a textured surface or a smooth surface.

Still referring to FIGS. 1, 2 and 8, the ring section 140 of the retaining sheath 100 may be generally configured to conform to the peripheral form of the electronic device 200 and form a perimeter around the exterior edge of the electronic device 200 with the retaining sheath 100 and the electronic device 200 mated. The ring section 140 may be flexible and include an inner channel 142 configured to receive and retain the exterior edge of the electronic device 200. At least one of the base section 120 and the ring section may further be configured to protect the electronic device 200 from damage related to physical shock, liquids, dust or other hazards. Both the base section 120 and the ring section 140 may be composed of a single material or a combination of materials which may include a substantially rigid material, for example, plastic, a flexible material, for example, food-grade silicon, or any other suitable material. One or more of the selected materials may be a shock-absorbing material. The base section 120 and the ring section 140 may be unitary or, in an alternative embodiment, may be individual components in communication with one another.

Still referring to FIGS. 1, 2 and 8, the ring section 140 further comprises at least one fingerswipe indentation 144. The at least one fingerswipe indentation 144, disposed on the front of the ring section 140 (i.e., the portion of the ring section 140 in communication with the front of the electronic device 200), is configured to provide a clearance area 144CA through the ring section 140. The clearance area 144CA of the at least one fingerswipe indentation 144 may comprise at least a portion of both a non-display region 240 and a touch-sensitive display region 220 of the electronic device 200. The at least one fingerswipe indentation 144 may be disposed on the ring section 140 in a predetermined location corresponding to a respective model of the electronic device 200. Thus, the at least one fingerswipe indentation 144 is configured to interface with the touch-sensitive display region 220 of the electronic device 200 so as to effect off-screen swiping functionality of a GUI of the touch-sensitive display region 220 of the electronic device 200 retained in the electronic device protection apparatus 10. This configuration may enable an electronic device 200 user to interface with the electronic device 200 GUI by swiping with one or more fingers, for example, substantially along an axis FSA, from the non-display region 240 of the clearance area 144CA of the at least one fingerswipe indentation 144 to the touch-sensitive display region 220. It should be noted that, while the axis FSA is shown as substantially horizontal in FIG. 8, the axis by which an electronic device 200 user may swipe from a non-display region 240 to a touch-sensitive display region 220 along a plane of the electronic device 200 may be any appropriate angle with respect to the electronic device 200. The combination of the base section 120 and the ring section 140 may further effect off-screen swiping functionality of the GUI of the touch-sensitive display region by securely orienting the at least one fingerswipe indentation 144 with at least one respective predetermined area 244 of the electronic device 200 relative to the touch-sensitive display region of the electronic device 200. The at least one fingerswipe indentation 144 may also be disposed on a portion of the ring section 140 so as to interface with at least one of the upper and lower edges of the touch-sensitive display region 220 and effect off-screen swiping functionality in a direction relative to the exterior edge of the electronic device 200.

Still referring to FIGS. 1, 2 and 8, the at least one fingerswipe indentation 144 may comprise at least one pair of fingerswipe indentations. Each fingerswipe indentation of the at least one pair of fingerswipe indentations may be disposed on opposing sides of the front of the ring section 140. Alternatively, the at least one fingerswipe indentation 144 may comprise at least one pair of fingerswipe indentations (or a group greater than a pair, e.g., 3 or more fingerswipe indentations), wherein each fingerswipe indentation of the at least one pair of fingerswipe indentations may be disposed on the same side of the front of the ring section 140.

Referring to FIGS. 1-3, the retaining sheath 100 may further include camera apertures conforming to the respective model of the electronic device 200. A rear-facing camera aperture 124 may be disposed on the base section 120 of the retaining sheath 100, the rear-facing camera aperture 124 location corresponding to the location of a rear-facing camera 260 of the electronic device 200. The rear-facing camera aperture 124 should be at least large enough so that at least the lens and the flash apparatus of the rear-facing camera 260 are not obstructed, but may be larger. Additionally, a front-facing camera aperture 152 may be disposed on the ring section 140 of the retaining sheath 100, the front-facing camera aperture 152 location corresponding to the location of a front-facing camera 262 of the electronic device 200. The front-facing camera aperture 152 should be at least large enough so that at least the lens and the flash apparatus of the front-facing camera 262 are not obstructed, but may be larger. The retaining sheath 100 may further include at least one camera hood 126. The at least one camera hood 126 may comprise an elevated contour extending outward from the retaining sheath 100 above and forming at least a partial perimeter around at least one of the rear-facing camera aperture 124 and the front-facing camera aperture 152, the at least one camera hood 126 being configured to reduce flash glare off of the electronic device protection apparatus 10, thereby improving picture quality.

Referring to FIGS. 1-2 and 4-7, the ring section 140 of the retaining sheath 100 may further include a plurality of air channels 146 configured to effect passive air cooling of the electronic device 200. As can be understood from FIG. 1, air may enter any one of the plurality of air channels 146, flow between the rear surface of the electronic device 200 and the base section 120, and then exit through any other one of the plurality of air channels 146. The gripping surface 122 of the base section 120 may be further configured to effect air flow through the area bounded by the retaining sheath 100 and the rear surface of the electronic device 200 by, for example, forming a textured surface of similarly elevated bumps or protrusions.

Referring to FIGS. 1-3 and 5-7, the base section 120 and the ring section 140 of the retaining sheath 100 may further include apertures conforming to the switches, buttons, ports, speakers, microphones or other components of the respective model of the electronic device 200 which are disposed on the exterior of the electronic device 200. Said apertures may include at least one auxiliary aperture 148 and/or at least one sound aperture 150. The at least one sound aperture 150 may correspond to the respective locations of one or more speakers and one or more microphones of the electronic device 200. The at least one sound aperture 150 may also be configured to amplify the sound heard by the electronic device 200 user by, for example, the use of one or a combination of reverberating chambers and orientation of the at least one sound aperture to direct the sound towards the electronic device 200 user. The at least one auxiliary aperture 148 may correspond to respective locations of one or more components disposed on the exterior of the electronic device 200 such as, but not limited to, switches, buttons, ports (for example, charging, or sound or video input/output ports) or any other appropriate components requiring access by an electronic device 200 user.

In accordance with one or more aspects of the present disclosure, an electronic device protection apparatus conformal with an electronic device is provided. The electronic device protection apparatus includes a retaining sheath having a base section disposed so as to cover the rear of the electronic device, and a ring section, including an inner channel, forming a perimeter around and receiving the exterior edge of the electronic device into the inner channel; and at least one fingerswipe indentation disposed on the ring section, wherein the at least one fingerswipe indentation is configured to interface with a touch-sensitive display region of the electronic device so as to effect off-screen swiping functionality of a graphical user interface of the touch-sensitive display region of the electronic device retained in the electronic device protection apparatus.

In accordance with one or more aspects of the present disclosure, the base section is configured for gripping a rear surface of the electronic device in opposition to an off-screen swiping gesture on a plane of the electronic device.

In accordance with one or more aspects of the present disclosure, the at least one fingerswipe indentation is disposed on the ring section in a predetermined location based on a respective model of the electronic device.

In accordance with one or more aspects of the present disclosure, a combination of the base section and the ring section effects off-screen swiping functionality of the graphical user interface of the touch-sensitive display region by securely orienting the at least one fingerswipe indentation with at least one respective predetermined area of the electronic device relative to the touch-sensitive display region of the electronic device.

In accordance with one or more aspects of the present disclosure, the at least one fingerswipe indentation comprises at least one pair of fingerswipe indentations, each fingerswipe indentation of the at least one pair of fingerswipe indentations being disposed on opposing sides of the ring section.

In accordance with one or more aspects of the present disclosure, the at least one fingerswipe indentation comprises at least one pair of fingerswipe indentations, each fingerswipe indentation of the at least one pair of fingerswipe indentations being disposed on the same side of the ring section.

In accordance with one or more aspects of the present disclosure, the at least one fingerswipe indentation is disposed on a portion of the ring section so as to interface with at least one of the upper and lower edges of the touch-sensitive display region and effect off-screen swiping functionality in a direction relative to the exterior edge of the electronic device.

In accordance with one or more aspects of the present disclosure, a protective bumper for an electronic device is provided. The protective bumper includes a flexible rim configured to securely grip and form a perimeter around an electronic device exterior edge; and at least one aperture disposed on at least the front of the flexible rim and configured to allow access through the flexible rim, by an electronic device user, to a clearance area comprising at least a portion of both a non-display region and a touch-sensitive display region of the electronic device, wherein a off-screen swiping operation can be performed by the electronic device user by swiping from the non-display region of the clearance area to the touch-sensitive display region.

In accordance with one or more aspects of the present disclosure, the protective bumper further comprises a base section disposed on the rear of the electronic device and configured for gripping a rear surface of the electronic device in opposition to an off-screen swiping gesture on a plane of the electronic device.

In accordance with one or more aspects of the present disclosure, the at least one aperture is disposed on the flexible rim in a predetermined location based on a respective model of the electronic device.

In accordance with one or more aspects of the present disclosure, a combination of the base section and the flexible rim securely orients the at least one aperture with the respective predetermined clearance area.

In accordance with one or more aspects of the present disclosure, the at least one aperture comprises at least one pair of apertures, each aperture of the at least one pair of apertures being disposed on opposing sides of the flexible rim.

In accordance with one or more aspects of the present disclosure, the at least on aperture comprises at least one pair of apertures, each aperture of the at least one pair of apertures being disposed on the same side of the flexible rim.

In accordance with one or more aspects of the present disclosure, the at least one aperture indentation is disposed on a portion of the flexible rim so as to interface with at least one of the upper and lower edges of the touch-sensitive display region and effect off-screen swiping functionality in a direction relative to the exterior edge of the electronic device.

In accordance with one or more aspects of the present disclosure, an electronic device protection apparatus conformal with an electronic device is provided. The electronic device protection apparatus includes a retaining sheath having a base section configured for gripping a rear surface of the electronic device in opposition to an off-screen swiping gesture on a plane of the electronic device, and a rim section configured to securely grip and form a perimeter around an exterior edge of the electronic device; and at least one fingerswipe indentation disposed on the rim section in a predetermined location based on a respective model of the electronic device, wherein a combination of the base section and the rim section is configured to securely orient the at least one fingerswipe indentation with at least one respective predetermined area of the electronic device relative to a touch-sensitive display region of the electronic device so as to effect off-screen swiping functionality of a graphical user interface of the touch-sensitive display region of the electronic device retained in the electronic device protection apparatus.

In accordance with one or more aspects of the present disclosure, the rim section includes an inner channel configured to receive the exterior edge of the electronic device.

In accordance with one or more aspects of the present disclosure, the at least one fingerswipe indentation comprises at least one pair of fingerswipe indentations, each fingerswipe indentation of the at least one pair of fingerswipe indentations being disposed on opposing sides of the rim section.

In accordance with one or more aspects of the present disclosure, the at least one fingerswipe indentation comprises at least one pair of fingerswipe indentations, each fingerswipe indentation of the at least one pair of fingerswipe indentations being disposed on the same side of the rim section.

In accordance with one or more aspects of the present disclosure, the at least one fingerswipe indentation is disposed on a portion of the rim section so as to interface with at least one of the upper and lower edges of the touch-sensitive display region and effect off-screen swiping functionality in a direction relative to the exterior edge of the electronic device.

In accordance with one or more aspects of the present disclosure, the base section is configured for gripping the rear surface of the electronic device in opposition to an off-screen swiping gesture from a non-display region to a touch-sensitive display region of the electronic device and a combination of the base section and the rim section is configured to securely orient the at least one fingerswipe indentation with at least one respective predetermined area of the electronic device relative to a touch-sensitive display region of the electronic device so as to effect off-screen swiping functionality of a graphical user interface of the touch-sensitive display region of the electronic device retained in the electronic device protection apparatus.

It should be understood that the exemplary embodiment disclosed herein can be used individually or in any suitable combination thereof. It should also be understood that the foregoing description is only illustrative of the embodiment. Various alternatives and modifications can be devised by those skilled in the art without departing from the embodiment. Accordingly, the present embodiment is intended to embrace all such alternatives, modifications and variances.

What is claimed is:

1. An electronic device protection apparatus conformal with an electronic device, the electric device protection apparatus comprising:
   a retaining sheath having a base section disposed so as to cover a rear of the electronic device, and a ring section, including an inner channel, forming a perimeter around and receiving an exterior edge of the electronic device into the inner channel; and
   at least one fingerswipe indentation disposed on the ring section,
      wherein the at least one fingerswipe indentation comprises a clearance area of the ring section extending from an innermost edge of the ring section through at least a portion of the ring section in a lateral direction opposite a touch-sensitive display region of the electronic device; and
      wherein the at least one fingerswipe indentation is configured to interface with the touch-sensitive display region so as to effect off-screen swiping functionality of a graphical user interface of the touch-sensitive display region of the electronic device retained in the electronic device protection apparatus.

2. The electronic device protection apparatus of claim 1, wherein the base section is configured for gripping a rear surface of the electronic device in opposition to an off-screen swiping gesture on a plane of the electronic device.

3. The electronic device protection apparatus of claim 1, wherein the at least one fingerswipe indentation is disposed on the ring section in a predetermined location based on a respective model of the electronic device.

4. The electronic device protection apparatus of claim 3, wherein a combination of the base section and the ring section effects off-screen swiping functionality of the graphical user interface of the touch-sensitive display region by securely orienting the at least one fingerswipe indentation with at least one respective predetermined area of the electronic device relative to the touch-sensitive display region of the electronic device.

5. The electronic device protection apparatus of claim 1, wherein the at least one fingerswipe indentation comprises at least one pair of fingerswipe indentations, each fingerswipe indentation of the at least one pair of fingerswipe indentations being disposed on opposing sides of the ring section.

6. The electronic device protection apparatus of claim 1, wherein the at least one fingerswipe indentation comprises at least one pair of fingerswipe indentations, each fingerswipe indentation of the at least one pair of fingerswipe indentations being disposed on the same side of the ring section.

7. The electronic device protection apparatus of claim 1, wherein the at least one fingerswipe indentation is disposed on a portion of the ring section so as to interface with at least one of an upper edge and a lower edge of the touch-sensitive display region and effect off-screen swiping functionality in a direction relative to the exterior edge of the electronic device.

8. A protective bumper for an electronic device comprising:
   a flexible rim configured to securely grip and form a perimeter around an electronic device exterior edge; and
   at least one aperture disposed on at least the front of the flexible rim and configured to allow access through the flexible rim, by an electronic device user, to a clearance area comprising at least a portion of both a non-display region and a touch-sensitive display region of the electronic device, the at least one aperture forming a finger guide passage, extending from an innermost edge of the flexible rim through at least a portion of the flexible rim in a lateral direction opposite the touch-sensitive display region, the finger guide passage comprising a passage surface configured to guide a finger of the electronic device user in a lateral direction through at least a portion of the flexible rim,
      wherein an off-screen swiping operation can be performed by the electronic device user by swiping from the non-display region of the clearance area to the touch-sensitive display region.

9. The protective bumper of claim 8, further comprising a base section disposed on a rear of the electronic device and configured for gripping a rear surface of the electronic device in opposition to an off-screen swiping gesture on a plane of the electronic device.

10. The protective bumper of claim 9, wherein the at least one aperture is disposed on the flexible rim in a predetermined location based on a respective model of the electronic device.

11. The protective bumper of claim 10, wherein a combination of the base section and the flexible rim securely orients the at least one aperture with the respective predetermined clearance area.

12. The protective bumper of claim 8, wherein the at least one aperture comprises at least one pair of apertures, each aperture of the at least one pair of apertures being disposed on opposing sides of the flexible rim.

13. The protective bumper of claim 8, wherein the at least on aperture comprises at least one pair of apertures, each aperture of the at least one pair of apertures being disposed on the same side of the flexible rim.

14. The electronic device case of claim 8, wherein the at least one aperture is disposed on a portion of the flexible rim so as to interface with at least one of an upper edge and a lower edge of the touch-sensitive display region and effect off-screen swiping functionality in a direction relative to the exterior edge of the electronic device.

15. An electronic device protection apparatus conformal with an electronic device, the electronic device protection apparatus comprising:
   a retaining sheath having
      a base section configured for gripping a rear surface of the electronic device in opposition to an off-screen swiping gesture on a plane of the electronic device, and
      a rim section configured to securely grip and form a perimeter around an exterior edge of the electronic device; and
   at least one fingerswipe indentation disposed on the rim section in a predetermined location based on a respective model of the electronic device, wherein the at least one fingerswipe indentation comprises a clearance area of the rim section extending from an innermost edge of the rim section through at least a portion of the rim section in a lateral direction opposite a touch-sensitive display region of the electronic device; and wherein a combination of the base section and the rim section is configured to securely orient the at least one fingerswipe indentation with at least one respective predetermined area of the electronic device relative to the touch-sensitive display region so as to effect off-screen swiping functionality of a graphical user interface of the touch-sensitive display region of the electronic device retained in the electronic device protection apparatus.

16. The electronic device protection apparatus of claim 15, wherein the rim section includes an inner channel configured to receive the exterior edge of the electronic device.

17. The electronic device protection apparatus of claim 15, wherein the at least one fingerswipe indentation comprises at least one pair of fingerswipe indentations, each fingerswipe indentation of the at least one pair of fingerswipe indentations being disposed on opposing sides of the rim section.

18. The electronic device protection apparatus of claim 15, wherein the at least one fingerswipe indentation comprises at least one pair of fingerswipe indentations, each fingerswipe indentation of the at least one pair of fingerswipe indentations being disposed on the same side of the rim section.

19. The electronic device protection apparatus of claim 15, wherein the at least one fingerswipe indentation is disposed on a portion of the rim section so as to interface with at least one of an upper edge and a lower edge of the touch-sensitive display region and effect off-screen swiping functionality in a direction relative to the exterior edge of the electronic device.

20. The electronic device protection apparatus of claim 19, wherein the base section is configured for gripping the rear surface of the electronic device in opposition to an off-screen swiping gesture from a non-display region to a touch-sensitive display region of the electronic device and a combination of the base section and the rim section is configured to securely orient the at least one fingerswipe indentation with at least one respective predetermined area of the electronic device relative to a touch-sensitive display region of the electronic device so as to effect off-screen swiping functionality of a graphical user interface of the touch-sensitive display region of the electronic device retained in the electronic device protection apparatus.

* * * * *